United States Patent [19]
Zepf

[11] Patent Number: 5,056,306
[45] Date of Patent: Oct. 15, 1991

[54] TRACK ASSEMBLY FOR TRACK-LAYING VEHICLE

[76] Inventor: Hans-Rudolf Zepf, Glärnischstrasse 15, 8803 Rüschlikon, Switzerland

[21] Appl. No.: 455,379
[22] PCT Filed: Mar. 21, 1989
[86] PCT No.: PCT/CH89/00057
§ 371 Date: Nov. 6, 1989
§ 102(e) Date: Nov. 6, 1989
[87] PCT Pub. No.: WO89/09105
PCT Pub. Date: Oct. 5, 1989

[30] Foreign Application Priority Data

Mar. 23, 1988 [CH] Switzerland .............. 01104/88

[51] Int. Cl.[5] ............................................. B62D 55/20
[52] U.S. Cl. ................................................ 59/84; 59/5; 59/35.1; 305/51; 305/54; 305/58 R
[58] Field of Search ............... 305/50, 51, 54, 55, 305/57, 58 R, 58 PC; 59/5, 7, 84

[56] References Cited

U.S. PATENT DOCUMENTS

| 2,924,470 | 2/1960 | Haushalter | 305/55 |
| 3,231,316 | 1/1966 | Ruf | 305/55 |
| 3,394,901 | 7/1982 | Roinestad | 305/50 |
| 3,721,476 | 3/1973 | Andersson | 305/58 |
| 4,093,319 | 6/1978 | Borner | 305/68 R |
| 4,139,241 | 2/1979 | Huhne et al. | 305/58 R |
| 4,175,797 | 11/1979 | Krekeler | 305/53 |
| 4,262,972 | 4/1981 | Falk | 305/58 PC |
| 4,444,441 | 4/1984 | Parker | 305/55 |
| 4,482,193 | 11/1984 | Boggs et al. | 305/54 |

FOREIGN PATENT DOCUMENTS

| 92832 | 9/1938 | Sweden | 305/54 |
| 373770 | 6/1932 | United Kingdom . | |

OTHER PUBLICATIONS

"bd baumaschinendienst", No. 2, Feb. 1988, Moderne Kettenkonstruktionen, pp. 72,73,74,76,78.

Primary Examiner—David Jones
Attorney, Agent, or Firm—Walter C. Farley

[57] ABSTRACT

In a process for producing a metal plate in such a way that it can be joined up to form a chain, use is made of a casting or forging tool, which forms a base part and a sole part of the plate, a specific sole part from several sole parts being associated with the base plate. The tool comprises at least one part forming the base part of the plate and another part forming the sole part of the plate. The resulting plate has reception rings on one plate side and an equal number of ring notches on the other plate side and side guides on the plate underside and at least one engagement gap.

11 Claims, 7 Drawing Sheets

TRACK ASSEMBLY FOR TRACK-LAYING VEHICLE

FIELD OF THE INVENTION

The invention is in the field of vehicle technology and relates to a process for the production of track plates for track-laying vehicle tracks or chains, a tool for performing the process and chains produced with these plates.

BACKGROUND OF THE INVENTION

When using building machines there is a need for substantially unlimited operational reliability and therefore constant availability of the equipment. This results from the interlinking of all the mechanized processes on the building site. Even the shortest unexpected breakdown of a production machine generally leads to further machine downtimes, waiting times for workers and possibly complicated and costly replacement solutions, so that the consequence is that the building work is delayed.

An article in "bd baumaschinendienst", No. 2, Feb. 1988, deals in this connection with modern chain constructions. It is also pointed out that this can affect the versatility of a machine, particularly when, even though an unexpected circumstance does not stop the machine, it is made unsuitable for use under given circumstances. The solution to this is calling in a further suitable machine or, to the extent possible, reequipping the existing machine to meet the new requirements. In this connection the problem of using track-laying vehicles in earthwork engineering and in particular the reequipping of the endless track is discussed and a solution to this problem is given.

In the case of track-laying mechanisms on construction machines, the daily dry cleaning and visual inspection, as well as a complete check for wear and maintenance conditions of all the mechanism components to be performed at somewhat longer time intervals, form part of the obligatory activities of a qualified construction or excavating machine driver. This statement, made in the aforementioned article, shows how difficult it is to use endless track chains, despite their marked robustness. Generally the track travelling gear with the tread, guide and drive rollers are made from steel, as is the chain, which as a rule has a chain part with base plates screwed onto two chain links. In order to withstand the high operating forces, a minimum size must be observed so that such chains have a relatively high mass, i.e., relatively few links on the circumference of the drive wheel. This leads to large base plate dimensions, which are not really desired. On deflecting, guiding or reversing the chain with the screwed on base plates, the latter are strongly spread apart, which has a number of disadvantages. Among these are that when the base plate is set down, i.e., at the time when it is brought from the return strand into the track strand, the plate edge projecting from the circumference strikes the substrate if the latter is flat, or if it is not flat the material therefrom is jammed in the gap which is still open after the reversal and which now closes. In addition, if the material on which the machine is standing is very hard, the machine is raised somewhat on each occasion, resulting in rough running.

In the case of smaller excavating machines, solutions have been sought which could not be used with larger machines. This more particularly applies to rubber chains, which are increasingly being used due to their known advantages. Notable advantages are substantially jointless deflection, a high degree of self-cleaning, better deflection characteristics, tread profiles instead of smooth or webbed base plates, which lead to much lower chain noise levels and much greater compatibility with pavement surfaces.

Thus, e.g., by inserting steel reinforcements in the rubber layer, much as for steel belted tires care, the tractive resistance is considerably increased, but is not as high as that of a steel chain. This is the reason why such advantageous chains have not yet been adopted for even medium size excavators. Unfortunately these advantageous rubber tracks can also not be used for other reasons for certain work, e.g., substrates covered with granite chips, in foundries, on hot slag, etc., so that to be able to cover all circumstances it is necessary to keep available two track-laying vehicles, namely one having rubber tracks for the aforementioned advantages and another with steel tracks where rubber tracks are unusable. This is clearly not an optimum solution from either a cost or logistics standpoint.

SUMMARY OF THE INVENTION

An object of the present invention is to provide a track chain, which can substantially cover both use ranges, i.e., which combines the advantages of both, while the manufacturing costs are no higher than for one or other track chain type. It must also be possible when manufacturing the chain links to allow all designs, without significantly increasing the manufacturing and tool costs. In addition, the track chain must be usable for different tread and deflecting rollers.

According to the invention this object is achieved by a process for the production of a track plate and a tool for performing the process or a track chain produced by assembling the track plates in accordance with the present invention.

BRIEF DESCRIPTION OF THE DRAWINGS

The invention is described in greater detail hereinafter relative to non-limitative embodiments and the attached drawings, wherein.

DESCRIPTION OF THE PREFERRED EMBODIMENTS

As the drive mechanisms for steel and rubber tracks fundamentally differ from each other, reequipping or converting from one type to the other, if possible in any case, involved an undue amount of conversion expenditure. It was therefore necessary to decide whether to acquire either rubber or steel track-laying vehicles or both, which was naturally a question of costs or use limitations.

Figure 1:
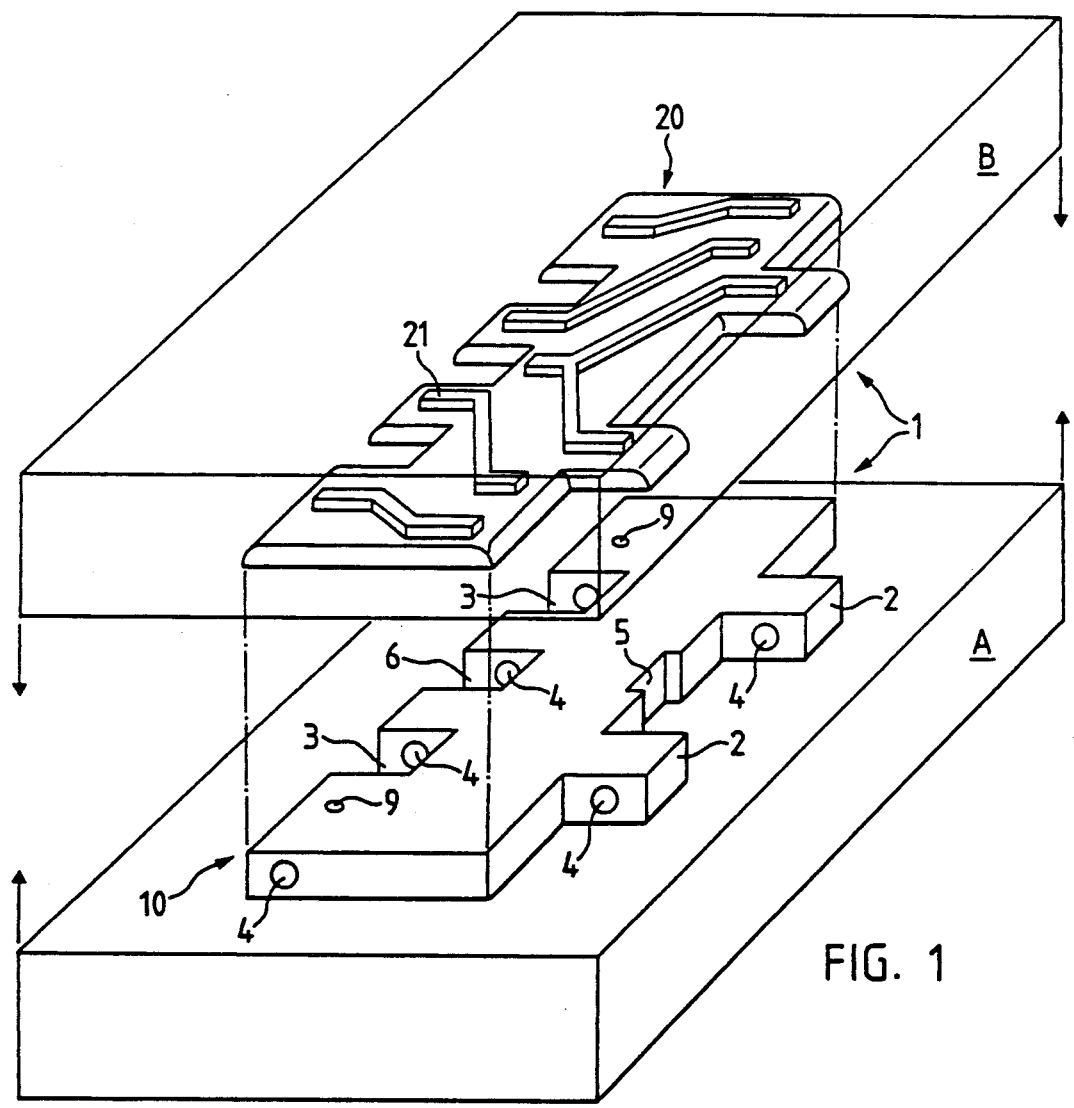
FIG. 1 is a three-dimensional perspective view of a track plate in a bipartite form, although in reality it is in one piece, located in a bipartite tool.
Figure 2A:
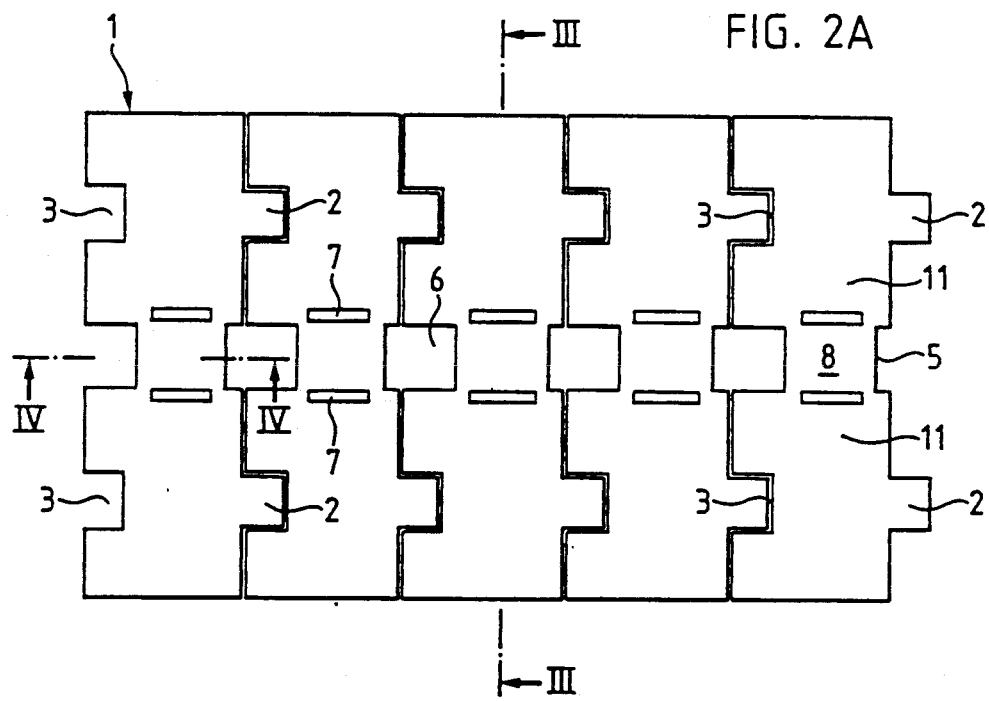
FIG. 2A is a plan view of part of a track belt viewed from the driving surface while in the return strand.
Figure 2B:
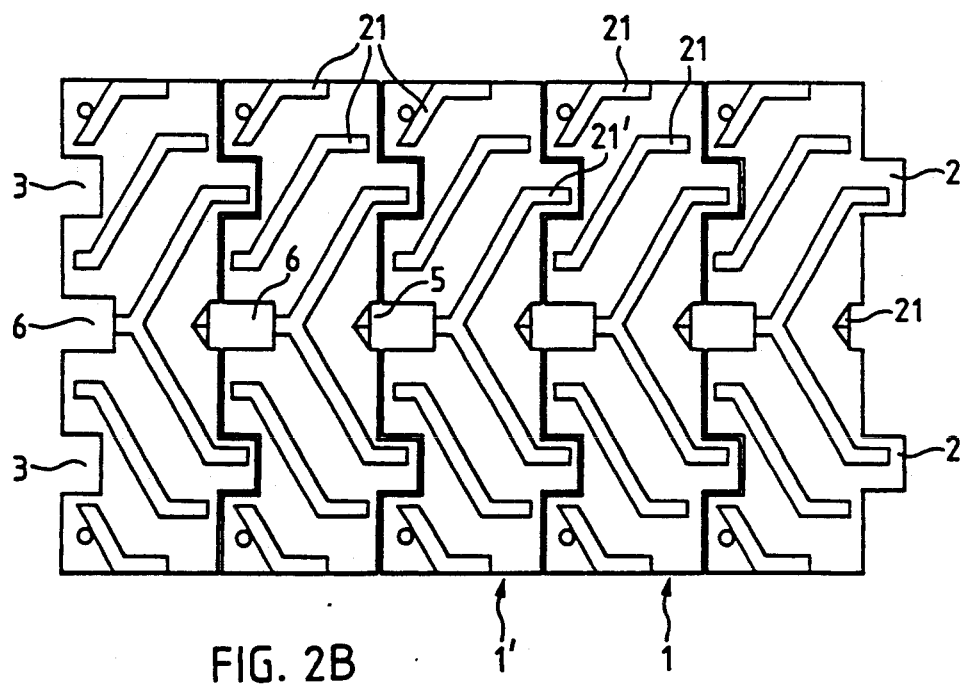
FIG. 2B is a bottom plan view of a track belt viewed from the profile (i.e., ground-contacting) side.

The idea which led to the invention was based on the assumption that the transfer of the advantageous characteristics of rubber chains to a corresponding construction of metal (steel) should be possible, although such a transfer had not previously been known. The initial tests revealed that a direct transfer was not possible and the problem was clearly linked with the design engineering for two different materials, which were not readily cross-applicable. A usable solution was not provided by a simulation of a rubber chain link in metallic form. It was necessary to find a new plate shape for the steel plate tracks, while not ignoring the sought versatility, with low manufacturing and material costs. The search for a final solution revealed that a fine link chain would lead to advantages, but, as stated hereinbefore, it was still necessary for achieving a certain degree of robustness to maintain certain minimum dimensions for the chain or track. As a brief introductory survey, FIG. 1 shows the principle of the shape solution of a track plate, which in a typical sole having the dimensions of 23×7.2 cm, led to the desired fineness and linking characteristics of the chain links into a track chain, accompanied by adequate stability. The sought versatility could be achieved and the manufacturing costs, as compared with rubber chains or conventional track steel chains, were lower. FIGS. 2A and 2B show five such plates assembled to form a track chain portion.

In a further development based on this principle, it is found that such chains could also be made from organic materials, e.g., tough plastics, which will be separately discussed hereinafter. Through the elasticity of an organic material, which must have characteristics closer to metals than rubber, it is more possible to take account of topographical situations (soil, substrate), than is possible with metal (use of tire technology criteria).

Figure 3:
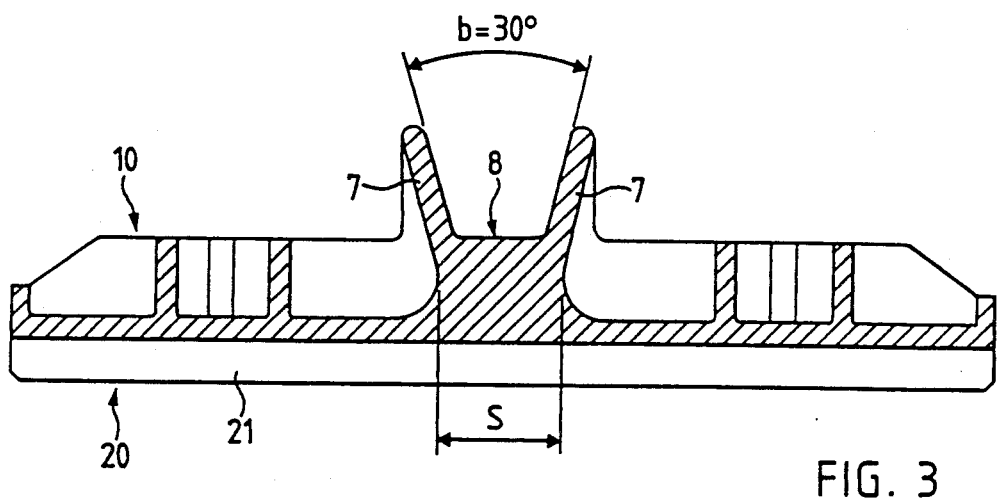
FIG. 3 is a track plate in longitudinal section along line III—III of FIG. 2.
Figure 4:
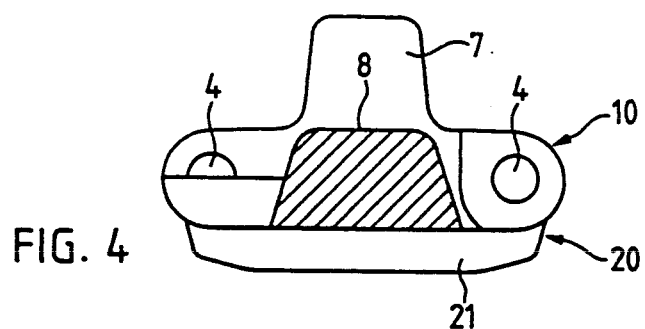
FIG. 4 is a transverse sectional view of the same track plate as in FIG. 3 along line IV—IV of FIG. 2.

FIG. 1 shows reception rings 2 for connecting the chain links 1, as well as recesses 5, 6 for force-transmitting engagement of the driving wheel. The two sections in FIGS. 3 and 4 show the lateral guide (guide lugs) 7 of the track plate, which prevent any lateral divergence of the bogie rolling parts running on the track, i.e., the track plates (further reference will be made hereinafter to the inner and outer tread surfaces for the tracks). The toothed driving wheel 30 (FIG. 5) with the teeth 31 for engaging with the chain, engages in the engagement gap 6 formed by the recess in the chain, so that this type of chain drive, as a result of the automatic ejection by the engaging driving tooth of the dirt rolled into said gap, has a self-cleaning action. The modular chain constructed in this way can be supplied in different lengths. As a function of the bogie length, a varying number of chain plates is required. A basic chain length can be supplied in assembled form, the additional length being supplied as individual plates. The additional plates supplied can be assembled just as easily as the chain according to the invention. This constitutes a brief introductory survey.

Turning now to the drawings in more detail, FIG. 1 shows a two-part mold A,B as a forging or casting mold for the production of a track plate 1. It comprises a lower part A, in which the base part 10 is shaped and an upper part B, in which the sole part 20 is shaped. In the embodiment according to FIG. 7 the lower part A has a shaped recess part, into which the sole part 20 subsequently can be inserted. This recess part can also be formed by the upper mold part B. Although the track plate 1 is shown formed separate by base and sole parts 10,20, the plate is only present in two-part form if the sole part, which is made from plastic, rubber, metal or some other material, is constructed as a subsequently interchangeable part. In this case a base part is produced with a "neutral" upper part or a recess part, together with the lower part and then a sole with a profile upper part is used thereon. The bipartite nature of the tool, which preferably produces one-part plates (with or without the sole), has the advantage that it is possible to manufacture ready-to-use track plates with random sole profiles and in part from different materials.

Figure 7:
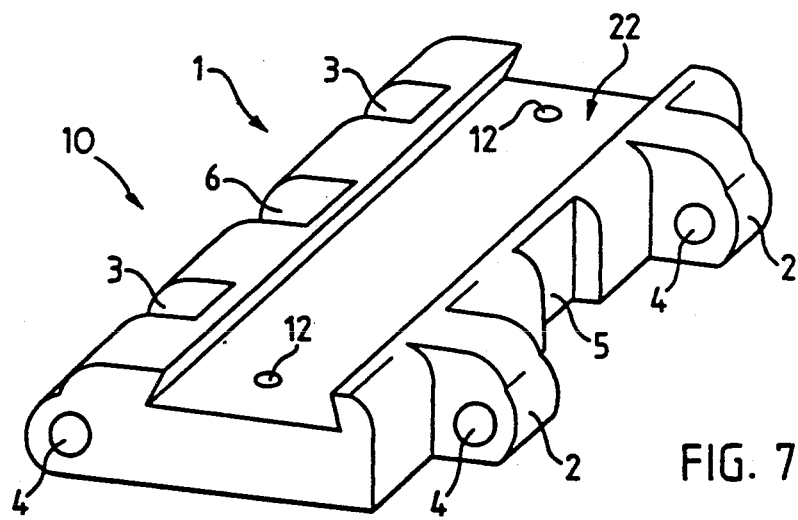
FIG. 7 is a perspective view of one example of a positive lock for inserting and fixing a profile sole, either as a replacement or during the manufacture of a track plate.

In another embodiment in place of a sole a locking recess is provided and onto it is mounted an already prepared sole part having the matching locking part. Thus, it is possible on the building site to remove the soles from the track plates and replace them by others, e.g., with a more suitable profile. Thus, defective plastic soles can be replaced or can be interchanged with metal soles. The locking parts can e.g., be constituted by a dovetail profile with a transverse securing means which can be knocked in, namely pins inserted in the sole part, which are driven into blind holes in the base part after fitting the sole part. These pins can be easily drilled out to permit replacement. This embodiment is shown in FIG. 7.

Up to now there have been no profiles on the treads of steel tracks and they were either smooth or provided with webs. This procedure also makes it possible to provide track plates with webs instead of profiles. For this purpose the tool upper part B is merely replaced by another one, which has the desired shapes. FIG. 2B shows an example of a shaped-on, self-cleaning profile.

Figure 5:
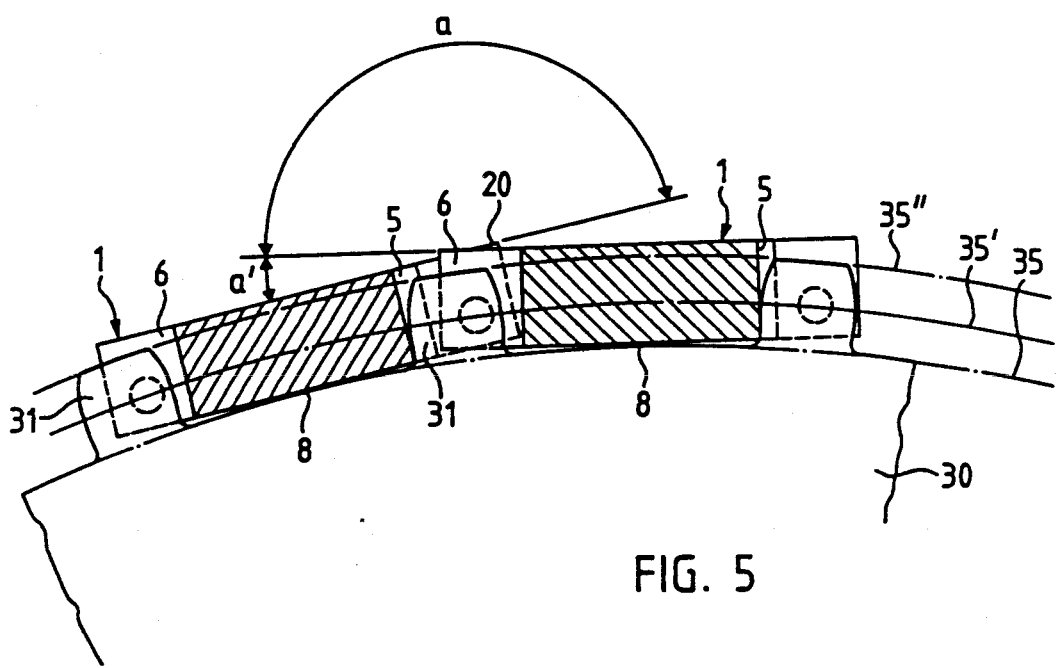
FIG. 5 is a diagrammatic side elevation view of a circumferential part of a track drive wheel engaged with the track chain.

The plate 1 produced in such a tool has on the base part 10 at least two reception rings 2 on one side and a corresponding number of ring notches 3 on the other side. Axle bores 4 permit the simple joining together of individual plates by means of king pins (not shown), which are placed through the axle bores 4. For securing the king pins, bores 9 are provided for the transverse passing through of axle locking pins (not shown). Each metal plate or plastic plate has additional recesses 6, which in the mounted state form an engagement gap to receive the teeth of a driving wheel (FIG. 5).

FIG. 2A shows a piece of chain with guide lugs as seen from below, i.e., from inside the track. FIG. 2B shows such a piece from above (with profile). One part of the plate is visible which is concealed in FIG. 1, namely the side guides 7 for the inner guiding and 7' for the outer guiding (FIG. 10A), which ensure that there is no sideways displacement of the chain on the travelling gear. Outside the row of side guides are provided on either side thereof the tread surfaces for the wheels. Between the rows of side guides is located the rolling path for the driving wheel. Between the rows of side guides is located the rolling path for the driving wheel. In the center is positioned the row of engagement gaps 6, which are spaced in accordance with the selected spacing of the driving wheel. It is clear that such a chain can be constructed in a substantially jointless manner. Even when deflecting or reversing, the gaps are so small that coarse dirt, such as stones and rock cannot penetrate. In addition to the jointless running surface of a chain occurring in the hinge system, this eliminates one of the essential loading forms.

FIG. 2B clearly shows the plate-covering profile design. The profile is here a positive profile, i.e., with ribs 21. A plate 1' and a plate 1 have the associated profiles 21' or 21. At the plate transition point where the reception ring 2 projects into the corresponding notch 3, profile rib 21' of plate 1' projects into the vicinity of profile ribs 21 on plate 1.

FIG. 3 shows a transverse section along line III—III of FIG. 2. This makes it possible to obtain the desired stiffness, while making optimum use of material. The opening between the side guides 7 in the form of guide lugs with the rolling surface 8 for the driving wheel has a wedge angle b, which is preferably approximately 30°. S is the approximate rail or track width, on which roll the bogie roll parts. It is once again possible to see base part 10 and sole part 20 with profile 21.

FIG. 4 shows a cross-section of the plate along line IV—IV in FIG. 2. It is possible to see the lateral shape of the side guide or guide lugs 7 and also one of the possible shapes of the shaped-on sole part 20. The rounding of the sole is such that when the plate is removed from the ground-contacting track strand, there can be no striking or raising with respect to the substrate in the case of flat ground, or scraping in the soil when the ground is rough. The two sectional views show the rib construction made possible by this type of chain, as compared with the complicated, multi-part chains having the conventional construction. The labor and material savings are readily apparent. As regards manufacture, assembly, maintenance and storage, the present chain has such advantages that it is much better than conventional steel chains.

FIG. 5 is a kinematic representation, in which there is a driving wheel 30 with part of the periphery having the driving teeth 31 for transmitting force to the chain 1. The teeth are inserted in the engagement gap 6 and so transfer the force to the chain. The flank form shown is arbitrary, but it is recommended that steep flanks be used, so that a maximum proportion of the tangential forces are transferred. 35 is the inner radius of rolling surface 8, 35" the outer radius of the tooth crest and 35' the pitch or center radius. On said center radius run the centers of the rings or king pins 4 (hinge configuration of the chain), so that torques between the chain and drive are eliminated and tilting, turning, position changes of the plates, etc. do not occur. The hinging point is always the force engagement point. On the driving wheel are placed two plates 1, which are inclined towards one another by deflection along the driving wheel periphery. The angle diverging from the plane is designated a and the "operating angle" a'. The term operating angle has the following meaning. The plates are merely joined together with king pins. There is no lubrication, so that the chain articulations or joints are dry, which leads to both maintenance and manufacturing advantages. In the case of a dry joint the size of the operating angle, i.e., the rotation angle between the king pin and the axle bearing is not unimportant. The smaller it is the more operating movements are possible within a joint life. On considering the driving wheel as a n-polygon with the side length of a plate, the larger n can be, the smaller the operating angle a'. Moreover, the smaller the operating angle, the larger the angle a describing the chain plane, which in the ideal case is 180°. This occurs if the plates are located in one of the two strands and certainly on the track strand. However, the smaller the plane angle a, the greater the projection of the sole end 20 of plate 1. FIG. 4 shows a lateral rounding of the sole part, which is chosen in such a way that the plate is placed in the track strand without striking. This permits a reciprocal optimization of two oppositely directed construction quantities. The n-polygon is chosen in such a way that, with respect to the width and length of the plate, n preferably has a ratio of 1:3 to 1:4. In the case of a chain with a width of approximately 30 cm, the side length of the n-polygon is to be between 7 and 10 cm. This leads to a driving wheel radius of approximately 30 cm with a circular pitch of the latter of n=24 and a side length of 8 cm. This is a realistic magnitude, even in the case of medium size to small excavating machines. Thus, for such a driving wheel there are six plates per quadrant, which is very high compared with conventional steel tracks and their deflections.

Figure 6:
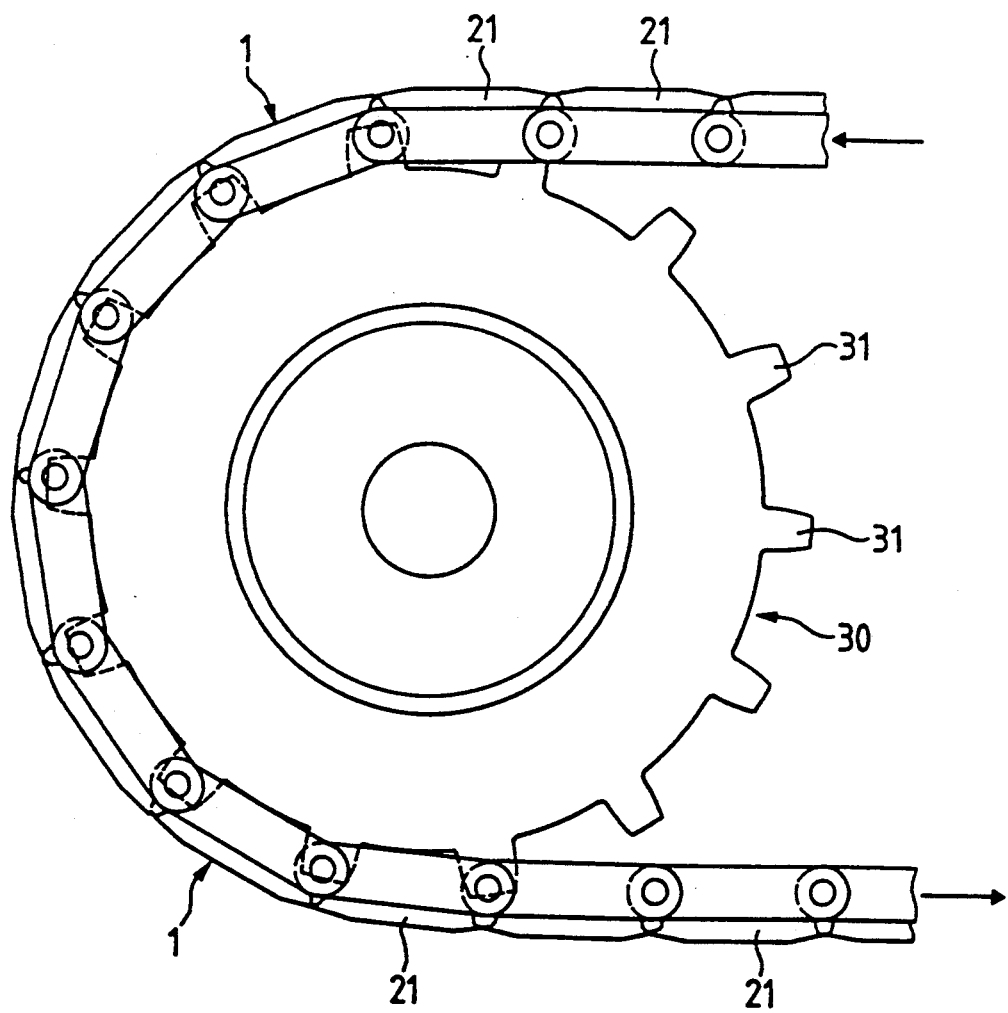
FIG. 6 is a diagrammatic side elevation of a circumferential part of the track vehicle drive, in which the engagement of the profiled sole is visible from the side and wherein, via rings and ring notches, the profile overlaps the plate joints (cf. also FIG. 2B)

FIG. 6 shows the soles adequately rounded, with a complete deflection or reversal of 180° about driving wheel 30. FIG. 7 shows an embodiment in which the base part 10 has a shaped-on form closure part. Preferably use is made of a dovetail form closure, so that the prepared soles of the desired material merely have to be laterally struck in and secured from above. For securing purposes bores 12 pass through the plate and into them can be driven a locking pin (not shown). In the case of a plastic sole, the sole can be molded around the locking pin, so that it will not be lost during storage and handling. When the sole is placed on the track plate, the locking pin can be driven into bore 12 with one or more hammer blows.

An advantage of the discussed chain is the force engagement, which here takes place in the chain plane. In the case of a conventional travelling gear made from steel, the force engagement does not extend into the chain plane, so that leverage has to be absorbed between the drive and the sole. This leads to additional loading and additional noise on reversing. On placing the plates on the track strand there are blows against the travelling gear, which increases wear.

With the constant improvement to materials in the direction of the strength of metal, such plates can also be made from a composite material based on plastics. Such plastic plates are then joined together by means of e.g., metal king pins. It is possible to choose advantageous material pairs, which increase the life of the joints. Generally, plastics have good surface characteristics.

Figure 8A:
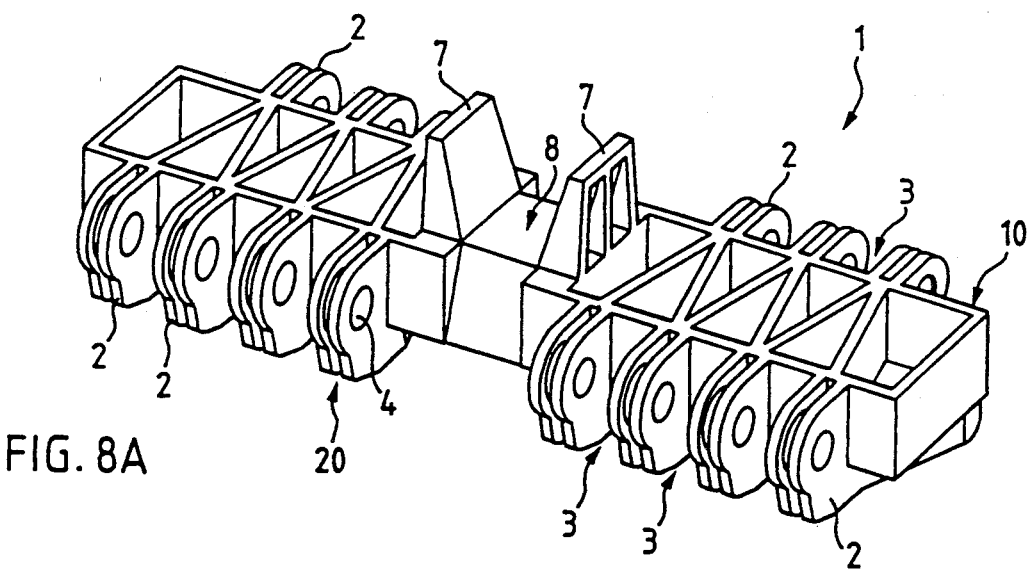
FIGS. 8A and 8B are top and bottom perspective views of a track chain link made from plastic, as viewed, respectively, from the roll tread and ground-contacting surface or base.
Figure 8B:
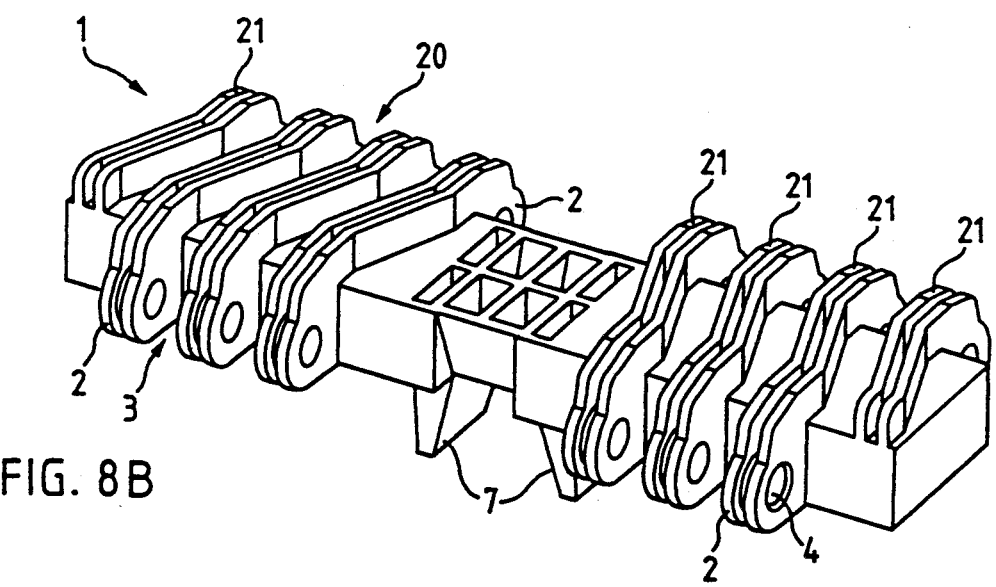
Figure 9:
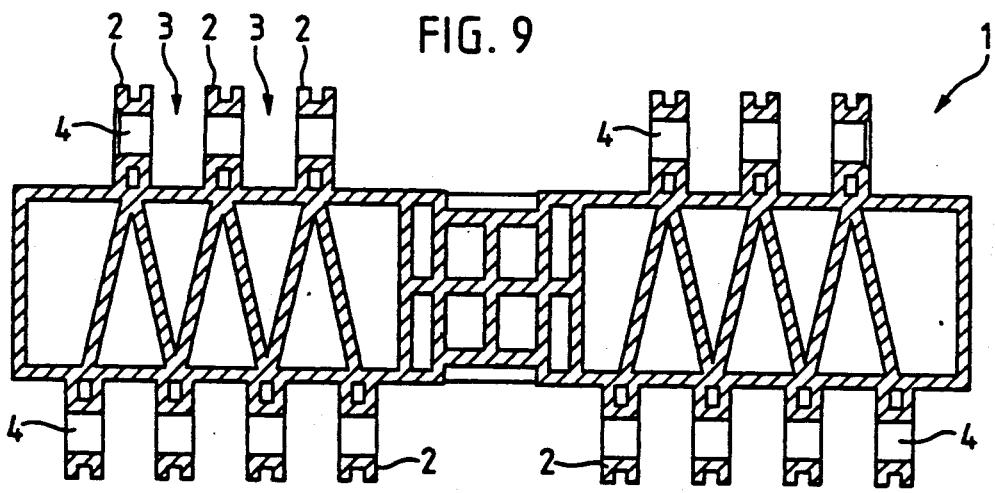
FIG. 9 is a plan view, in transverse section, of a chain link according to FIG. 8.

A chain link made from a tough plastic is shown in two viewing directions in FIGS. 8A and 8B. For casting or injection molding reasons, the "ribs" for reinforcing the link and the ribs for the profile are made with the same wall thickness. In order to produce the same profile width, here two ribs are required for each profile web 21. In the represented example there is a fine link chain with additional rings, i.e., a track chain with a denser hinging. However, here again the aforementioned principles are applied. FIG. 9 shows a cross-section for showing the "rib system" in the case of constructions made from organic materials, which in future will increasingly displace metallic materials. These three drawings illustrate the transfer of the inventive concept to plastics. However, it is clear that the given construction and production principle is not bound to one material, even though the advantages of a metallic material are particularly stressed.

Figure 10A:
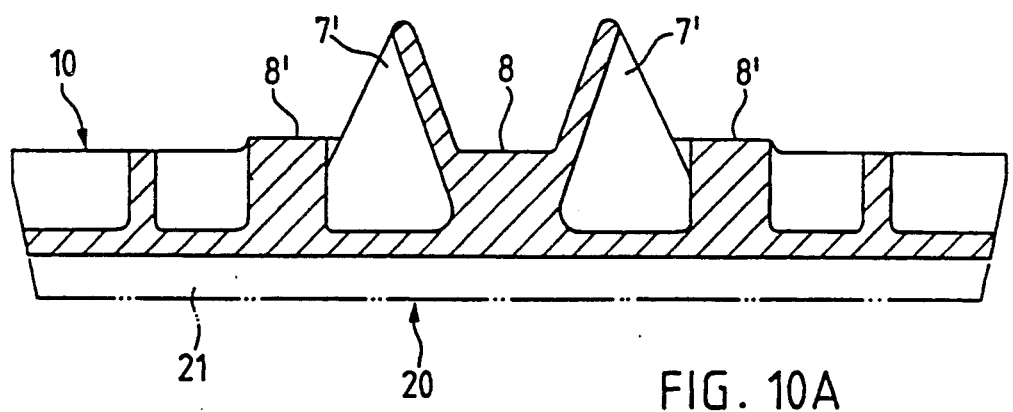
FIGS. 10A and 10B are transverse sectional and front elevation views, respectively, of a construction of the roll guide for chain links made from metal and plastic with inner and outer tread surfaces for the tread rollers of the travelling gear.
Figure 10B:
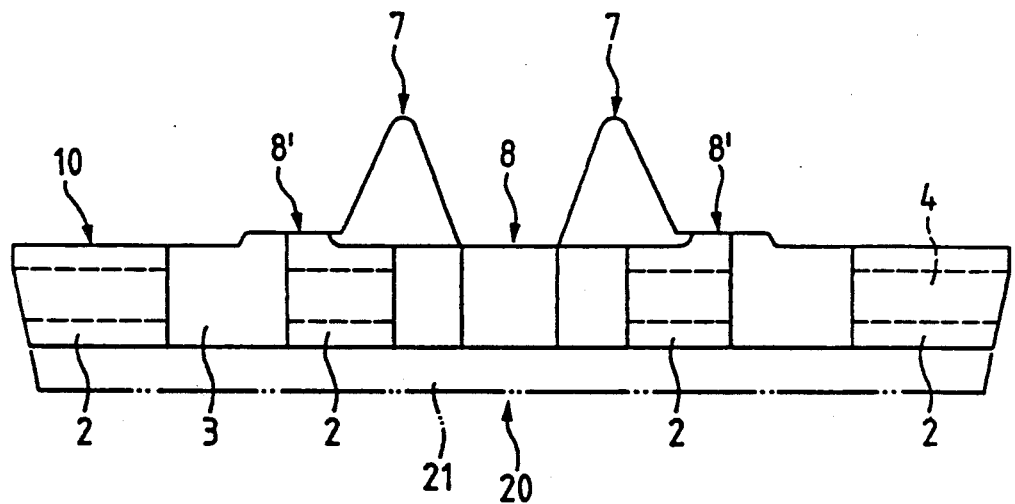

The presently discussed metal or plastic chains can be constructed with an inner or outer tread surface for tread and guide rollers. This constructional measure is illustrated in FIGS. 10A and 10B. Compared with the construction according to FIG. 3, the side guides 7 are widened symmetrically outwards and roller treads 8' are provided on both sides of the guides. The inner roller tread 8 shown in FIG. 3 is retained. FIG. 10B shows the typical lug shape for chain links for the chain of an excavator.

The measure of creating laterally inner 8 and outer 8' roller treads on the same chain makes it possible to use the chain together with different track roller types, namely outer or inner. The track roller types with outer tread are probably going to gradually replace those with an inner tread, so that here a solution is offered for the plastic chains of the future, which are operated with an outer tread.

Figure 11:
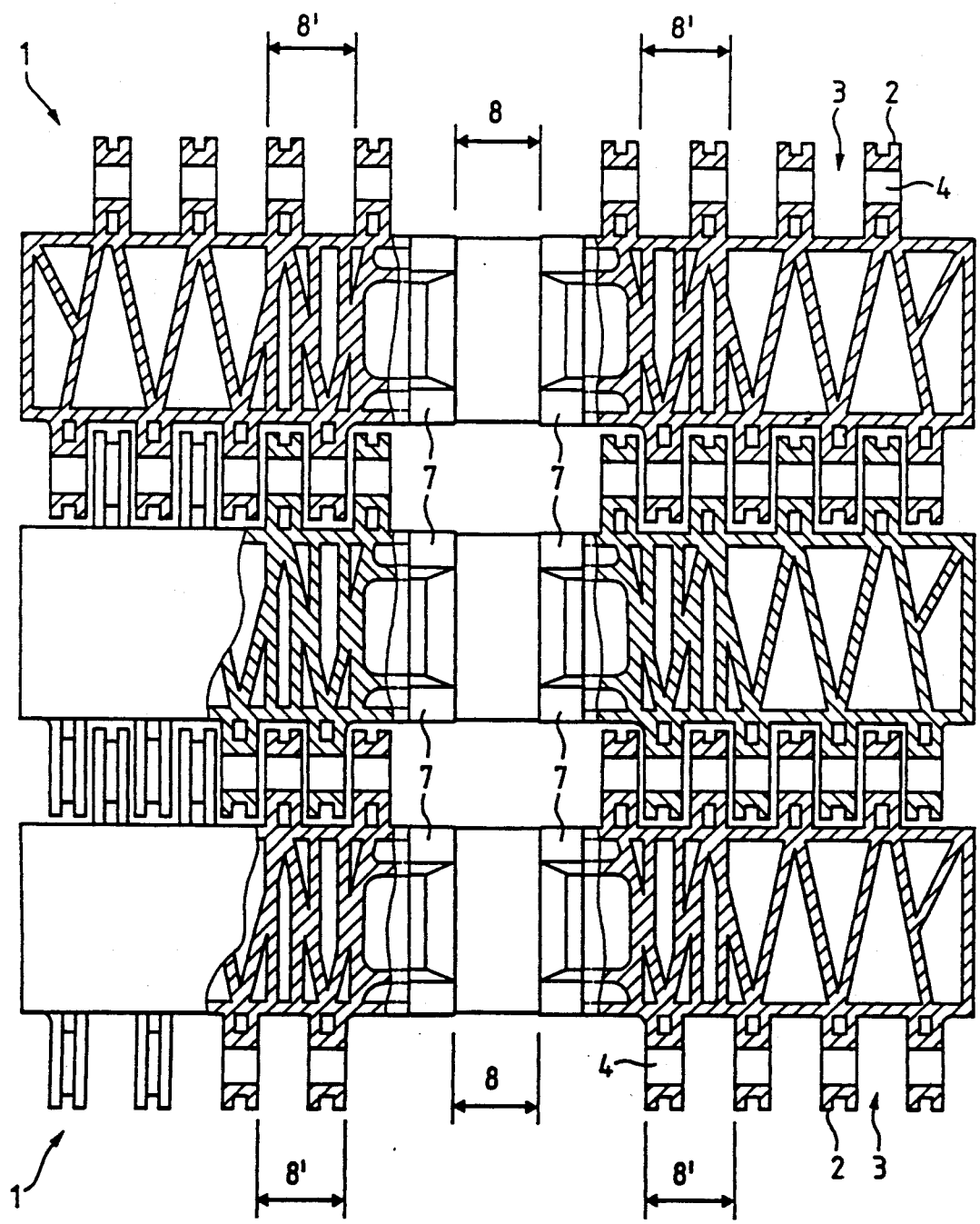
FIG. 11 is a plan view in partial section of the outer and inner tread surfaces for outer and inner tread rollers on a track chain section having plastic links.

Even though no special measures have to be taken for the chain with an outer tread when using metallic materials, a material reinforcement must be provided on the rolling path when using organic materials. In order to obviate a combination of different materials, e.g., a combination of metal/plastic or plastic/plastic which makes manufacture more expensive, it is here proposed to enlarge the rib density in the vicinity of the rolling paths. This is shown in FIG. 11, which shows a chain portion of joined together chain links. The additional ribs (the same web width) in the vicinity of the outer treads 8' reveal two rolling paths when the links are joined together to form a chain. The unstressed rolling path 8 in the center is retained. Thus, both tread roller types can be used with the same chain.

Thus, the discussed chain fulfills all the aforementioned requirements. It can be easily fitted and dismantled and fits on the travelling gear of excavators with rubber tracks so that such vehicles can be quickly reequipped with limited labor costs. Obviously, reequipping is possible at any time, provided that the mass of the metal plate corresponds to the pitch circle ratio of the driving wheel of the rubber chain. Damaged plates can be easily replaced. The sole of the chain can be matched to requirements, needs and conditions by the choice of the tool part B. With regards to the engagement gaps, the chain is self-cleaning, because the driving tooth penetrating the gap forces the rolled-in dirt out of it. Manufacture is simple and, for standard runs, the plates can be cast, but are advantageously forged for very large runs. The possibility of fitting self-cleaning profiles to the plate sole, e.g., for machines which are working in the fields, without having to modify manufacture, offers a great adaptability of production to the needs of the consumer.

No matter what the profile construction, if the transition between the individual plates is incorporated into it, i.e., if the profile extends over the plate transition, then desired jointless transition is ensured and is even better than that hitherto achieved with rubber plates. This leads to the sought rolling, circumferentially performing, jointless transition.

I claim:

1. An endless track assembly for a track-laying vehicle of the type having a circumferentially toothed drive wheel and a plurality of guide wheels forming a bogie, the track comprising the combination of a plurality of track plates hingedly connected to each other to form said track assembly, each of said plates comprising a base part and a sole part, said base part including front, rear and side edges, one of said front and rear edges having a plurality of protruding rings and the other of said front and rear edges having first means defining a plurality of ring recesses shaped and dimensioned to receive said rings of an adjacent base part, and second means defining a drive recess having a driving face for receiving and engaging a tooth of said drive wheel, said rings and said means defining said recesses each having coaxially aligned transverse bores, each said base part including guide lugs for engaging said guide wheels, and each said sole part including a ground-engaging surface with ribs including rib portions extending onto said rings so that when the rings of one plate are received in the recesses of an adjacent plate the ribs of the two plates overlap, said rib portions extending onto said rings being reduced in height relative to the remainder of said ribs on said sole portion; and a plurality of king pins transversely penetrating said bores in said rings of one plate and said means defining recesses of an adjacent plate to hingedly interconnect adjacent plates.

2. A track assembly according to claim 1 wherein said toothed drive wheel has a pitch center, and wherein said bores are positioned so that said king pins have central axes substantially passing through said pitch center.

3. A track assembly according to claim 2 wherein said base part and said sole part are made of metal.

4. A track assembly according to claim 2 wherein each said plate includes two said rings on one front or rear edge and two said ring recesses along the opposite edge, said drive recess being located between said two ring recesses.

5. A track assembly according to claim 4 wherein said sole part and said base part include means defining mating connection parts for forming a positive connection therebetween.

6. A track assembly according to claim 5 wherein said mating connection parts form a dovetail connection.

7. A track assembly according to claim 2 wherein said base part and said sole part are made of plastic.

8. A track assembly according to claim 7 wherein said base part is molded with inner reinforcing ribs having the same wall thickness as said ribs on said sole part.

9. A track assembly according to claim 1 wherein said base part and said sole part are made of plastic.

10. A track assembly according to claim 9 wherein said base part is molded with inner reinforcing ribs having the same wall thickness as said ribs on said sole part.

11. A track assembly for a track-laying vehicle of the type having a circumferentially toothed drive wheel and a plurality of guide wheels forming a bogie, the track comprising the combination of a plurality of identical track plates hingedly connected to each other to form said track assembly, each of said plates comprising a base part and a sole part, said base and sole parts being made of substantially the same material, said base part including a body having first and second major surfaces and front, rear and side edges, said rear edge having an even number of protruding rings and said front edge having first means defining the same even number of ring recesses shaped and dimensioned to receive said rings of an adjacent base part, and second means defining a drive recess having a driving face centrally located along said edge between said ring recesses for receiving and engaging a tooth of said drive wheel, said rings and said means defining said recesses each having coaxially aligned transverse bores, each said base part including guide lugs on one of said major faces for engaging said guide wheels, and each said sole part including a ground-engaging surface with ribs including rib portions extending onto said rings so that when the rings of one plate are received in the ring recesses of an adjacent plate the ribs of the two plates overlap across the central axes of said bores, said rib portions extending onto said rings being reduced in height relative to the remainder of said ribs on said sole portion; and a plurality of king pins transversely penetrating said bores in said rings of one plate and said means defining recesses of an adjacent plate to hingedly interconnect adjacent plates.

* * * * *